United States Patent [19]

Meek

[11] Patent Number: 4,832,267

[45] Date of Patent: May 23, 1989

[54] APPARATUS FOR DISPENSING MATERIAL

[75] Inventor: Nigel W. Meek, Long Crendon, England

[73] Assignee: Catharine F. Meek, Long Crendon, England

[21] Appl. No.: 21,508

[22] Filed: Mar. 4, 1987

[30] Foreign Application Priority Data

Mar. 4, 1986 [GB] United Kingdom ............... 8605353
Apr. 9, 1986 [GB] United Kingdom ............... 8608586

[51] Int. Cl.⁴ .................. A01C 17/00; B65G 33/30
[52] U.S. Cl. ................................ 239/675; 239/672; 198/664
[58] Field of Search ............... 239/662, 672, 675, 678; 198/660, 662, 664, 676; 222/412, 413

[56] References Cited

U.S. PATENT DOCUMENTS

| 297,675 | 4/1884 | Chambers | 198/664 |
|---|---|---|---|
| 376,552 | 1/1888 | Rossler | 198/664 |
| 1,073,425 | 9/1913 | Lambert | 198/664 X |
| 2,663,405 | 12/1953 | Messing | 198/662 X |
| 3,289,926 | 12/1966 | Hiller | 198/662 X |
| 4,362,272 | 12/1982 | Martin | 239/7 |
| 4,473,184 | 9/1984 | Martin | 239/675 X |

FOREIGN PATENT DOCUMENTS 0077000 4/1983 European Pat. Off. .
2124879 2/1986 United Kingdom .
2150100 10/1986 United Kingdom .

OTHER PUBLICATIONS

FIGS. 1–3 of British Patent No. 2758, published 7 Jul. 1879.

Primary Examiner—Andres Kashnikow
Assistant Examiner—Patrick N. Burkhart
Attorney, Agent, or Firm—Cushman, Darby & Cushman

[57] ABSTRACT

Apparatus for spreading manure comprises an elongate hopper 12 mounted on a mobile frame. An axial feed rotor 18 runs along the inside of the base of the hopper and urges manure forwardly to a transfer rotor 25 which pushes the material sideways through an opening 21 to an overshot impeller 23 which throws the manure sideways from the apparatus. On the axial feed rotor 18 are blades 19 extending outwardly from the axis of the rotor and inclined in such a manner as to push the material along the direction of the axis. The blades 19 are positioned on a reverse helical path around the rotor axis, the sense of the reverse helical path being opposite to the sense of inclination of the individual blades. In this arrangement the efficiency of axial delivery of the rotor 18 is substantially lower than if the blades were positioned along a helical path around the rotor axis having the same sense as the inclination of the individual blades. The reduced efficiency of axial delivery of the rotor can be matched to the capability of the sideways-directed impeller 23.

18 Claims, 6 Drawing Sheets

APPARATUS FOR DISPENSING MATERIAL

The present invention relates to apparatus for dispensing material, especially but not exclusively for spreading manure.

In this specification, the term manure means any form of organic waste material which it is required to spread over the ground to improve soil quality, and includes animal and poultry excrement whether alone or when mixed with waste vegetable material such as straw stubble, and includes such material whether in a solid, semisolid slurry, or partially or wholly liquid form. The invention relates particularly to machinery used for spreading farmyard manure, but also relates to apparatus used for mixing and delivering animal foods. Often the same apparatus will be used by farmers for spreading manure and for delivering animal feed stuffs.

One known form of farmyard manure spreader has a trough shaped body in which a conveying means pushes the material to be spread along the trough to a side delivery and unloading means. The normal mechanism for pushing the material towards the side delivery and unloading means is an interrupted auger located near the bottom of the trough. This delivers the material onto a sideways displacing, spring steel, paddle blade assembly which feeds the material into a spreading and throwing impeller which discharges it roughly at 90° to the direction of travel.

During operation problems are liable to occur for a variety of reasons. The auger core has about its circumference at successive points along its length the blades making up the interrupted flight thereof. The auger may comprise a core of box section steel with the blades attached in four banks at 90° intervals. Alternatively the auger core may be tubular in a cross-section, and the blades may be fitted as an interrupted helix of varying pitch over the length of the auger. In the known configurations, the auger tends to be too efficient when running clean, so delivering more material than the discharge means can remove. The surplus material so delivered is then compressed between the fresh supplies of advancing material and the end of the spreader body, whence it may spill over the sides, or so load the auger that the shear bolts protecting the drivelines fail, or, most commonly, bridge over the side-delivery means, which then ceases, wholly, or partially, to remove material, so altering the discharge rate, if not stopping discharge altogether. As pressure builds up, straw, or similarly long material, starts to wrap about the leading edges of the auger flights, so reducing their efficiency at the same time as reducing the longitudinal clearance between adjacent blades. As a consequence an annular ring of highly compressed material is built up until the auger has "barrelled", and ceases to function as such. Material so compressed is subject to considerable force, and becomes extremely difficult to remove by hand, and cannot be cleared by running the machine. In powdery materials such as poultry deep litter, in which substantially dry droppings are mixed with wood shavings, bridging can also occur, and the highly compressed material is again very difficult to remove.

Various solutions have been proferred to the above problems, ranging from hydraulically powered press arms, under manual control, used to break up a "bridge" by pressing it downwards onto the side delivery means; fitting a further set of auger flights beyond the side delivery means, reversed to turn material back into the side delivery means; fitting a power driven reciprocating sliding side panel in the trough shaped body containing the material to be spread, in the region of the side delivery means, in order to urge material downwards by the friction between the sliding panel and the material being handled; and fitting a second reverse auger parallel to and above the first said auger to return surplus material whence it came.

None of the above solutions provides a complete answer, and all require additional power and mechanisms.

It is an object of the present invention to provide an improved apparatus for dispensing material, and, in preferred embodiments to provide a manure spreading apparatus with improved action in conveying manure by a feed rotor to an impeller of the apparatus for distributing the manure over the ground.

According to the present invention there is provided apparatus for dispensing material comprising a container for material, an exit for discharge of material from the container, and an axial feeding rotor for effecting movement of the material within the container in a direction along the axis of the rotor towards the exit, the rotor having a plurality of blades extending outwardly from the axis of the rotor, each blade being inclined to the rotor axis in such a manner as to effect the said movement of material along the axis of the rotor, the blades being positioned on the rotor in such a manner that the efficiency of axial delivery of the rotor is substantially lower than if the blades were positioned along a helical path around the rotor axis having the same sense as the inclination of the individual blades.

It is particularly preferred that the arrangement of the blades on the rotor should be such that the blades are positioned on a reverse helical path around the rotor axis, the sense of the reverse helical path being opposite to the sense of inclination of the individual blades. In effect, this means that the blades are positioned in the most inefficient position possible for the axial delivery of the rotor, as compared with the most efficient position for the blades, which occurs when the blades are positioned along a helical path around the rotor axis having the same sense as the inclination of the individual blades, (i.e. a helical path compatible with the inclination of the individual blades). When the blades are positioned on the reverse helical path, it can be arranged, by appropriate selection of the circumferential angle occupied by each blade, and by the spacing of the blades along the reverse helix, that material is not fed efficiently from one inclined blade to the next, but instead suffers a dwell period upon leaving a blade, before being picked up and conveyed by the next blade. In preferred arrangements this dwell period can be made to occupy a large proportion of a 360° circumference of the rotor, so that the rotor runs very inefficiently compared with a conventional interrupted flight auger. By this means the feed rotor can be matched in its axial delivery to the capability of subsequent components of the apparatus, for example an impeller for spreading material discharged from the container. An additional advantage of the blade arrangement of the present invention is that a mixing action is introduced into the material as well as the conveying of the material along the axis of the feed rotor.

Although the preferred arrangement of the invention is that the blades are positioned on a reverse helical path around the rotor axis, it is to be appreciated that other arrangements of blades may be made within the scope of the invention, whilst fulfilling the requirement that the efficiency of axial delivery of the rotor is lower than if the blades were positioned along a compatible helical path in the manner of a conventional interrupted flight auger.

In a particularly preferred form, the inclination of each blade to the rotor axis (which produces the axial movement of the material), is substantially equal to the inclination of the reverse helical path, but in the opposite sense. In preferred embodiments, succeeding blades along the reverse helical path are spaced from each other circumferentially by an angle lying in the range 101°±10°, preferably the angle being 101°.

In a preferred construction of the feed rotor, the rotor includes an axial core on which the blades are mounted, and preferably the leading edge of each blade follows a shallow curve leading away from the core to allow elongate, fibrous or matter material to slide up the edge of the blade and off the blade without blocking the rotor. In one preferred form the leading edge of each blade follows substantially a segment of an involute curve generated from the circumference of a circle. Another preferred feature is that each blade has a trailing edge which is substantially straight, preferably the trailing edge of the blade lying substantially along a radius of the axial feed rotor.

It is preferred that the rotor is constructed so that the blades are positioned in a pattern such that when viewed along the axis of the rotor no two blades are exactly in line, and it is also preferred that the blades are so shaped that, when viewed along the axis of the rotor, immediately adjacent succeeding blades along the rotor do not overlap. A preferred angle of inclination of each blade to the rotor axis is that the angle lies in the range 60°±10°, preferably the angle being 58°.

As has been mentioned, the invention has particular application where the apparatus includes discharge means positioned in the region of the exit for effecting movement of material which passes through the exit, the efficiency of the axial delivery of the axial fee rotor being reduced by the said positioning of the blades so as to be matched substantially to the capability of the discharge means.

In accordance with another preferred feature of the present invention, the container is in the shape of a trough having a base such that the space between the outer periphery of the axial feed rotor and the base of the trough includes dead areas unswept by the axial feed rotor in which in operation some of the material may lodge, the lodged material then providing in operation a frictional stripping action on material engaged by the axial feeding rotor. In one preferred form, the base of the container has a polygonal internal surface which is substantially symmetrical about a vertical plane passing through the axis of the axial feed rotor.

The invention has particular application when embodied in apparatus for dispensing material from a mobile container, especially, apparatus for spreading manure. In one such arrangement, the container is mounted on a mobile frame for movement over the ground, and there is provided discharge means for discharging from the container material fed towards the exit by the axial feed rotor. Preferably the axial feed rotor is mounted in the container with its axis of rotation aligned generally along the direction of movement of the apparatus, the exit comprising an opening in the side of the container (relative to the intended movement of the frame), and the discharge means being arranged to discharge the material sideways from the apparatus, for example the discharge means comprising an impeller mounted outside the container in the region of the side opening for throwing the material sideways from the apparatus by rotation of the impeller.

In such an arrangement, the invention has particular applicability because the longitudinal axial feed rotor tends to deliver material more quickly than can be dealt with by the sideways acting discharge means, which leads to compaction, bridging, and barrelling. By positioning the blades of the feed rotor according to the invention, the efficiency of the axial delivery of the axial feed rotor can be reduced so as to be matched substantially to the capability of the discharge means.

In accordance with a further, independent, aspect of the present invention, there is provided apparatus for dispensing material comprising a mobile frame for movement over the ground; a container for the material; an opening in the side of the container relative to the direction of intended movement of the frame for discharge of material sideways from the container; an axial feed rotor for effecting movement of the material within the container in a direction along the axis of the rotor towards the exit, the rotor having a plurality of blades extending outwardly from the axis of the rotor, each blade being inclined to the rotor axis in such a manner as to effect the said movement of material along the direction of the rotor axis; the blades being positioned on the rotor on a reverse helical path around the rotor axis, the sense of the reverse helical path being opposite to the sense of inclination of the individual blades, and discharge means positioned in the region of the side opening of the container for discharging from the container the material fed towards the discharge opening by the axial feed rotor, the discharge means being arranged to expel the material sideways from the apparatus.

Apparatus embodying the invention has use in many applications other than manure spreading. For example dispensing apparatus embodying the invention may be used as a feeder wagon for depositing silage into a manger for cattle, and in such a case a hood may be provided over the impeller so as to direct the feed downwardly into the manager. The apparatus may be used for strewing straw in a yard for bedding. Bales of straw may be released from the string ties thereof and deposited in the container. The auger, transfer means and impeller will then shred the straw and distribute it onto the yard floor. In another application, forage such as chopped grass maybe transported in the container, and may be unloaded by operation of the auger, transfer means, and impeller. The grass may be thrown out into a silage pit or may form a silage mound in a yard. In a further example, grain may be transported in the container and then be unloaded in a building by being thrown in a stream by the impeller.

Embodiments of the invention will now be described by way of example with reference to the accompanying drawings, in which.

In general, the overall construction and operation of the manure spreading apparatus to be described is as set out in our previous published patent GB-2124870-B, except for the modifications made in accordance with the present invention.

Figure 1:
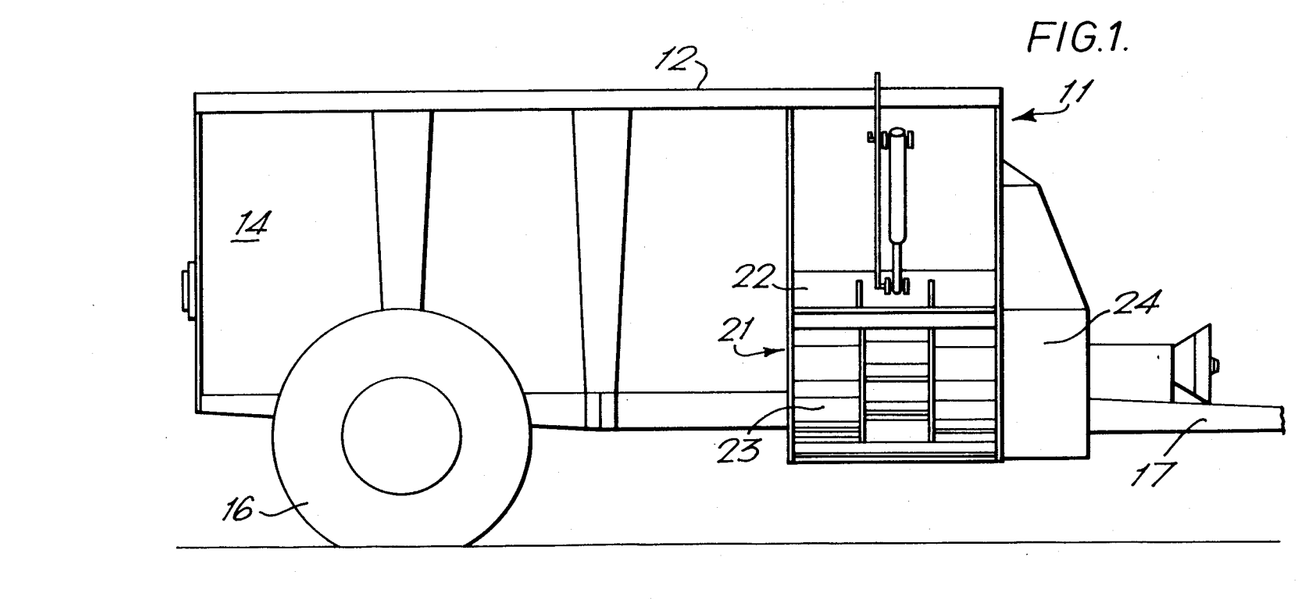
FIGS. 1 and 2 show side and plan views respectively of apparatus for spreading manure embodying the present invention, and illustrate the apparatus in general overall form.
Figure 2:
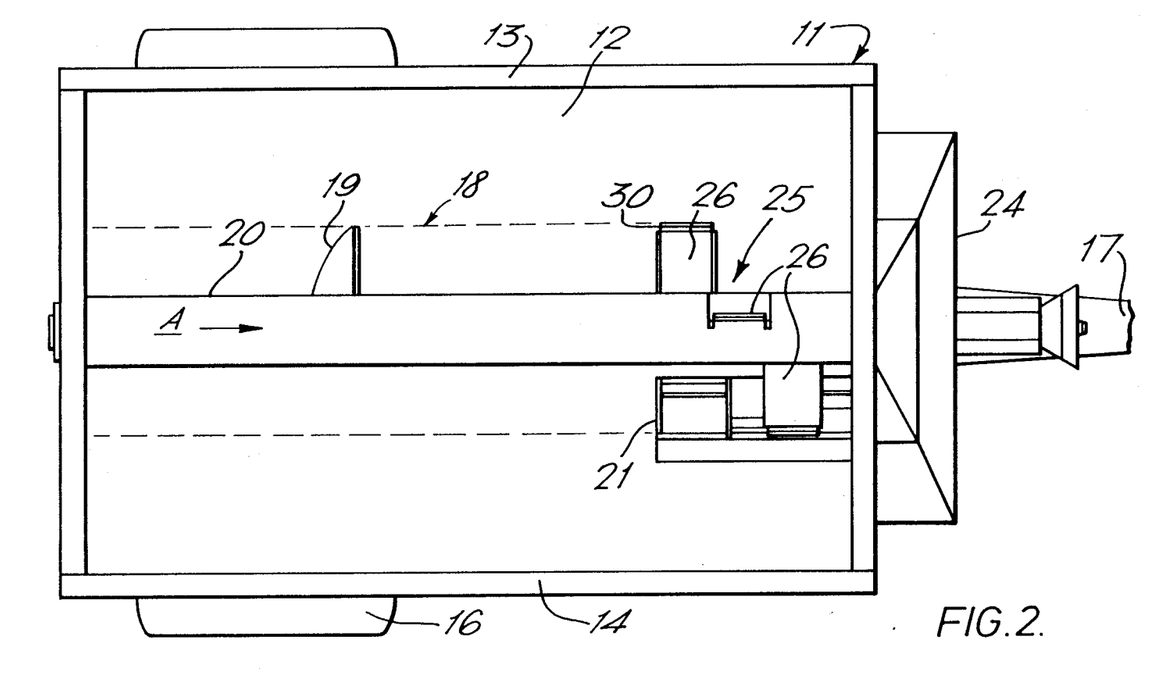
Figure 3:
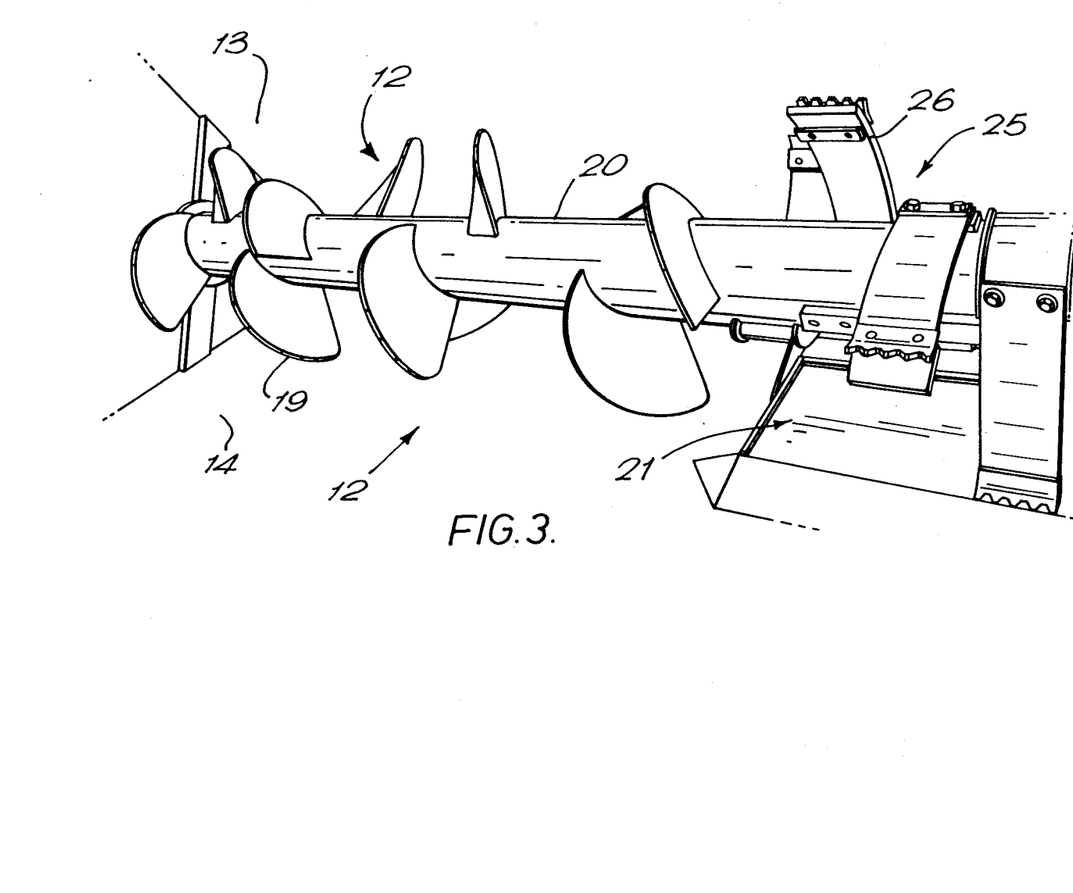
FIG. 3 is a perspective view of the interior of the apparatus of FIGS. 1 and 2, taken from above.

Referring firstly to the present FIGS. 1, 2 and 3, a manure spreading apparatus 11 comprises an elongate hopper 12 having inwardly sloping sides 13 and 14, and mounted on land wheels 16 to be towed by a linkage 17 behind a tractor (not shown). Inside the hopper 12 running along the base thereof is an axial feed rotor 18 indicated generally by broken lines and having a plurality of outwardly directed blades of which one is shown at 19 mounted on a core 20. An opening 21 is provided at the front of the apparatus 11 on the right-hand side in the side wall 14, for distribution of manure. The opening 21 may be closed by a hydraulically operated gate 22. Just outside the opening 21 an impeller 23 is mounted for driven rotation about a horizontal axis in an overshot mode such as to throw manure emerging from the opening 21 upwardly and sideways of the apparatus 11 so as to distribute the manure over the fields. Both the impeller 23 and the feed rotor 18 are driven from the pto of the tractor, by way of reduction gearing 24.

Each of the blades 19 of the axial feed rotor 18 is inclined to the rotor axis in such a manner as to draw manure forwardly into the vicinity of the opening 21 from the rear of the hopper 12. Each of the blades is inclined both by being set across the axis of the rotor, and also is inclined over part of its area by tilting towards the rear of the hopper.

The positioning of the blades 19 on the core 20 is arranged in accordance with the invention, and will be described in more detail hereinafter. However the overall effect is that each blade 19 is inclined to the rotor axis in such a manner as to effect movement of material in a direction along the axis of the rotor towards the exit opening 21. The main inclination of each blade to the axis is arranged to be such that material engaged by the leading face of the blade is urged substantially axially along the rotor towards the opening 21, in the general manner of a flight or vane of an auger. However, the blades are arranged in a pattern such that they do not follow each other along a helical path having the same sense as the inclination of each blade, as is the manner in prior art feed augers of the interrupted vane type. The purpose of the pattern of the blades 19 on the core 20 is to arrange for the efficiency of axial delivery of the rotor 18 to be substantially lower than if the blades were positioned along a helical path around the rotor axis having the same sense as the inclination of the individual blades. In addition, to reducing the efficiency of the axial delivery of the rotor 18, the positioning also introduces a mixing action in the material.

At the section of the core 20 directly opposite the opening 21, there is positioned a transfer rotor 25 which is coaxial with the feed rotor 18 and shares a common core 20. At the transfer rotor 25, the blades 19 of the feed rotor 18 are replaced by paddles 26 forming the transfer rotor 25. The paddles 26 are arranged in a helical series of paddles, and axially adjacent paddles are offset from one another so as to provide an open structure of the transfer rotor 25.

The purpose of the transfer rotor 25 is for the paddles 26 to push manure through the opening 21 to the impeller 23 in a direction substantially at right-angles to the axis of rotation of the axial feed rotor 18. The rotor 18 is rotated in a sense such that the transfer rotor 25 rotates in an undershot mode transfering the manure to the impeller 23 which operates in an overshot mode.

Figure 4:
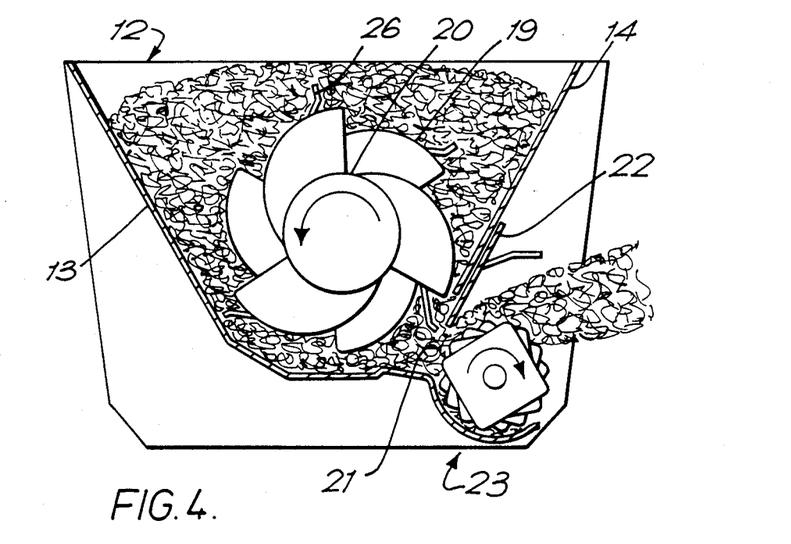
FIG. 4 is a diagrammatic end view of the interior of the apparatus of FIGS. 1 and 2, partly in section, and taken generally in the direction indicated by arrow A in FIG. 2.

In FIG. 4 there is shown in diagrammatic cross section a view along the axis of the feed rotor 19, facing towards the front of the apparatus, in the direction A in FIG. 2. The diagrammatic representation shows the arrangement of the blades 19 extending outwardly from the core 20, and shows the paddles 26 for pushing the manure through the opening 21 to the impeller 23. The required rotation of the core 20, and the impeller 23, is achieved in known manner by various chain drives exterior to the hopper, driven by the pto of the tractor drawing the apparatus. It is to be appreciated that in alternative arrangements, the impeller 23 may be rotated in the opposite direction to that shown, that is to say in the undershot mode, as is known in the art.

The main feature of the present invention will now be described by reference to two diagrammatic figures, namely FIG. 5 and FIG. 6. In each case, the Figure shows a development of a feed rotor such as the feed rotor 18 shown in the preceding Figures, that is to say that in both FIG. 5 and FIG. 6, the surface of the core which is shown and indicated at 20 represents a 360° development of the surface of the core 20.

Figure 5:
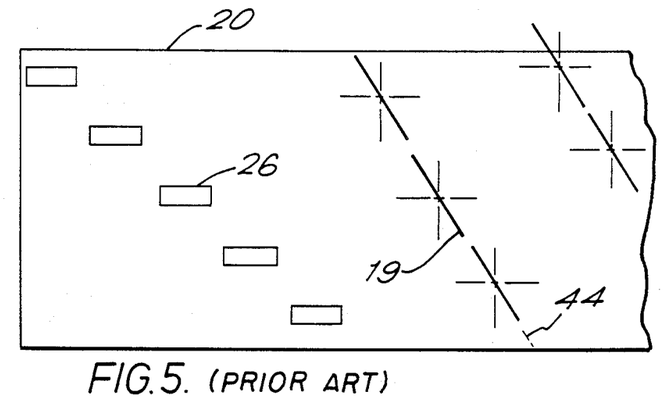
FIG. 5 is a diagrammatic plan view of a development of the surface of an axial feed rotor of known form.

FIG. 5 shows a form of axial feed rotor which has been used previously and is known, and does not show the arrangement described so far with reference to FIGS. 1 to 4. In this known form of axial feed rotor, blades 19 are arranged along a helical path indicated by the dotted line 44, which helical path extends around the rotor axis in the same sense as the inclination of the individual blades 19. This in effect produces an interrupted vane auger, which is highly efficient in transferring the material, and the material is picked up and conveyed faster by the blades 19 than it can be removed by the paddles 26 and impeller 23. As a result, the material is compressed by the auger, leading to bridging and barrelling.

Figure 6:
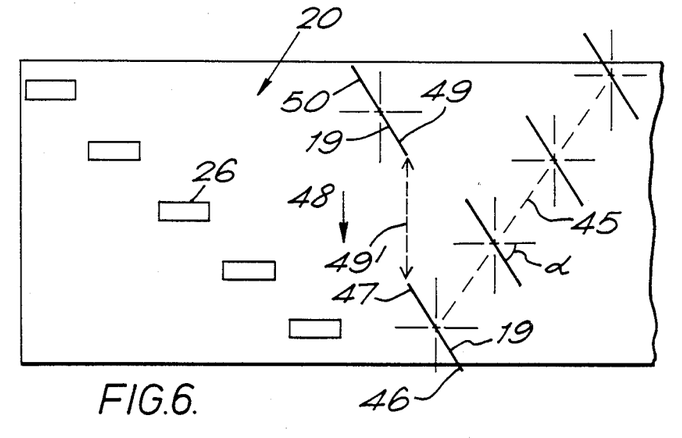
FIG. 6 is a diagrammatic plan view of a development of the surface of an axial feed rotor embodying the invention as shown in the preceding FIGS.

In FIG. 6 there is shown an arrangement embodying the present invention, which overcomes or reduces these problems. In the arrangement of FIG. 6, the blades 19 are positioned on a reverse helical path indicated by the dotted line 45 around the rotor axis, the sense of the reverse helical path being opposite to the main inclination of the individual blades 19 which produces the required axial movement of the material. By this is meant that the inclination concerned is the main inclination of the blade 19, that is to say that the inclination shown in FIG. 6 as the angle α.

The arrangement shown in FIG. 6 has a number of advantages. Considering the lowermost blade 19 in FIG. 6, material engaged by the blade at the end 46 will be urged along the face of the blade 19 towards the end 47, by the rotation of the core 20 in the direction indicated at 48. After the material has ceased to be engaged by the end 47 of the blade 19, the material will remain unengaged for a section of rotation of the rotor 18 indicated by the dotted line 49'. This arc mounts to some 150° of rotation, and indicates the inefficient nature of the axial delivery of the rotor since during this period the material does not progress along the axis of the rotor. The material is then picked up by the end 49 of the left most blade 19 in FIG. 6, and progresses along the face of the blade to the other end 50.

Thus in the embodiment of the invention, the blades have been positioned on the rotor in such a manner that the efficiency of axial delivery of the rotor is substantially lower than if the blades were positioned along a helical path (44 in FIG. 5) around the rotor axis having the same sense as the inclination of the individual blades. By reducing the axial delivery efficiency in this way, the delivery of material to the paddles 26 and impeller 23 can be matched to the capability of the impeller 23, so as to avoid compression, bridging and barrelling. Furthermore, there is the additional advantage that the blades 19 when positioned in this way introduce a mixing action into the delivery of the material.

It is particularly to be appreciated that, whilst the blade position shown in FIG. 6 along a reverse helix is particularly preferred, the blades may also be positioned in other arrangements away from the compatable helix 44 shown in FIG. 5, so as to achieve the aim of reducing the efficiency of axial delivery.

Returning to the preferred form of the invention, a particularly preferred arrangement of the blades is that the blades 19 are spaced circumferentially around the core 20 at 101°, and the size and shape of each blade is such that over the length of the feed rotor only one blade is adjacent to the side wall of the container at any given moment. The size of each blade is also preferably arranged so that when viewed along the axis of the rotor no two blades are exactly in line. Such an arrangement is shown in FIG. 4.

Figure 7:
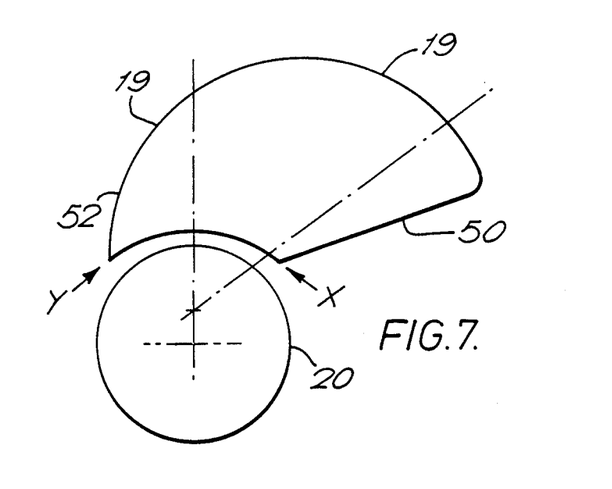
FIG. 7 is a diagrammatic end view of the axial feed rotor shown in FIGS. 1 to 4, with a blade of the rotor removed from the rotor and repositioned perpendicular to the axis of the rotor, for purposes of explanation.

Another preferred feature of the present invention is that a particular shape of each blade 19 is chosen, and such a shape is shown in FIG. 7. FIG. 7 shows an end view of the core 20, and shows a view of a blade 19, not in its normal attached position, but in an imaginary position where the blade 19 is rotated until it lies in a plane perpendicular to the axis of the core 20. Thus it will be appreciated that the radius of the inner edge of the blade indicated between Y and X is at a greater radius than the radius of the core 20. When the blade 19 is rotated to its operational position, the radius YX fits exactly along the core 20. When placed in this required position, the rear most edge 50 of the blade 19 lies substantially along a radius of the core 20, the remainder of the blade being tilted towards the rear of the apparatus, i.e. away from the direction of movement of the material.

Referring to FIGS. 3 and 7, the leading edge 52 of the blade 19 rises in a shallow curve from the core 20 so as to allow any straw or other material which hairpins on the blade, to slide up the leading edge of the blade freely, rather than clogging the blade. A preferred shape which may be used is based on an involute curve generated from the circumference of a circle, a segment of such a curve being selectd so as to give a required shallow initial rise of the leading edge of the blade.

Figure 8:
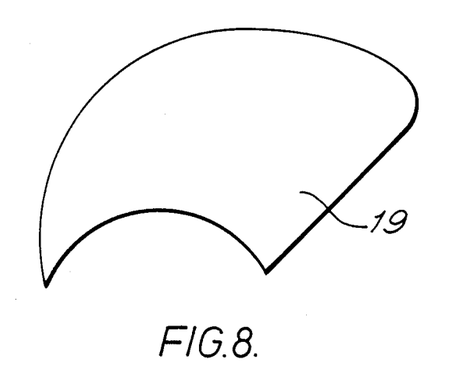
FIG. 8 is a diagrammatic end view of a modified shape of the blade of FIG. 7, again with the blade removed from the rotor and repositioned perpendicular to the axis of the rotor.
Figure 9:
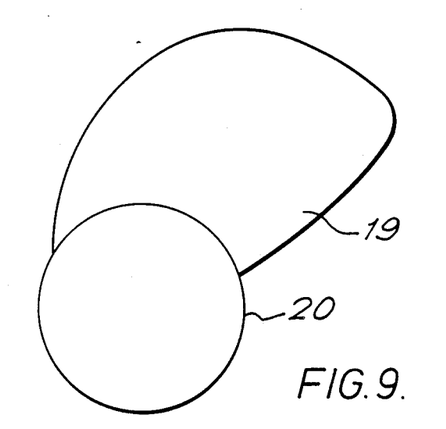
FIG. 9 is a diagrammatic end view of the blade of FIG. 8 when positioned in the normal operating position on the rotor.

In FIGS. 8 and 9 there is shown a further example of a preferred blade 19. In FIG. 9 the blade 19 is shown attached to the core 20, and in FIG. 8 the blade is shown in true plan view, in the same manner as in FIG. 7.

Finally, there may be provided in accordance with another aspect of the invention a feature that the base of the trough-like container 12 may be formed with a polygonal internal surface over most of the length of the trough, as shown in FIG. 4. In this Figure the internal surface of the hopper 12 is shown to be formed of flat sections inclined to each other in section at obtuse angles. A consequence of such shaping is that materials lodges in the dead areas of the said angles where there is an increase in clearance between the periphery of the rotor 18, and the internal surface of the hopper 12. Material so lodged effectively acts as a stripper on material engaged by the axial feed rotor 18. This arrangement has a similar effect to known apparatus where steel strippers are set in the base of a hopper, but the present arrangement is less expensive, and allows easier release of any large body which is included in the material being handled and which can be swept away without causing any damage such as might arise if steel strippers were provided.

It will be appreciatd that the embodiment described with reference to the drawings, although primarily intended for spreading manure, may also be used for distributing other material, whether with or without modification such as provision of a hood over the impeller to direct material downwardly rather than generally upwardly and outwardly.

I claim:

1. Apparatus for dispensing material comprising:
   a container for material, the container having first and second longitudinally extending side walls, the first and second end walls, said first and second side walls converging towards each other,
   a discharge opening in said first side wall of the container,
   a feeding rotor having an axis, said rotor being arranged within said container such that its axis extends longitudinally thereof, said rotor being rotatable about its axis to effect movement of material within the container longitudinally thereof, and
   discharge means arranged proximate to said discharge opening and arranged to cause material from said discharge opening to be expelled laterally of said container,
   wherein said feeding rotor comprises a longitudinally extending core, and a plurality of individual blades mounted on said core to extend outwardly of said rotor axis,
   said blades being positioned on said core on a helical path extending around the rotor axis, each individual blade being at an angle relative to said rotor axis to extend across said helical path, and wherein said helical path extends in a reverse sense relative to the intended longitudinal direction of movement of the material whereas said blades extend in the forward sense wherein the blades are positioned on said rotor such that no two blades are exactly aligned longitudinally of said rotor.

2. Apparatus according to claim 1, in which each said blade is also at an angle relative to said first end wall of the container.

3. Apparatus according to claim 1 or 2, in which the inclination of each blade to the rotor axis is substantially equal to the angle between the reverse helical path and said rotor axis, but in the opposite sense.

4. Apparatus according to claim 1 or 2, in which succeeding blades along the reverse helical path are spaced from each other circumferentially by an angle lying in the range 101°±10°.

5. Apparatus according to claim 1, in which each blade has a leading edge which extends outwardly of said rotor core, each said leading edge following a shallow curve to allow elongate, fibrous or matted material to slide up the leading edges of said blades.

6. Apparatus according to claim 5 in which the leading edge of each blade follows substantially a segment of an involute curve generated from the circumference of a circle.

7. Apparatus according to claim 5 in which each blade has a trailing edge which is substantially straight.

8. Apparatus according to claim 7 in which the trailing edge of each said blade lies substantially along a radius of the feeding rotor.

9. Apparatus for dispensing material comprising:
a container for material, the container having first and second longitudinally extending side walls, and first and second end walls, said first and second side walls converging towards each other,
a discharge opening in said first side wall of the container,
a feeding rotor having an axis, said rotor being arranged within said container such that its axis extends longitudinally thereof, said rotor being rotatable about its axis to effect movement of material within the container longitudinally thereof, and
discharge means arranged proximate to said discharge opening and arranged to cause material from said discharge opening to be expelled laterally of said container,
wherein said feeding rotor comprises a longitudinally extending core, and a plurality of individual blades mounted on said core to extend outwardly of said rotor axis,
each blade extending at an angle relative to said rotor axis, and wherein said blades are so shaped and positioned that no two blades are exactly aligned longitudinally of said rotor said blades being positioned on a helical path extending around the rotor axis, each individual blade being at an angle relative to said rotor axis to extend across said helical path, and where in the helical path extends in a reverse sense relative to the intended longitudinal direction of movement of the material whereas said blades extend in the forward sense.

10. Apparatus according to claim 9, in which each blade has a leading edge extending outwardly of said rotor core, each said leading edge following substantially a segment of a curve.

11. Apparatus according to claim 10, in which each blade has a trailing edge which is substantially straight and which lies substantially along a radius of said feeding rotor.

12. Apparatus according to claim 9, in which the angle of each blade relative to said rotor axis is within the range 50 to 70.

13. Apparatus according to claim 9 in which the blades are so shaped that, when viewed along the axis of the rotor, immediately adjacent succeeding blades along the rotor do not overlap.

14. Apparatus according to claim 9, wherein said discharge means comprise a discharge expeller having an axis which extends substantially longitudinally of the container, said expeller being rotable about its axis for expelling said material laterally, and wherein the efficiency of the longitudinal delivery of the feed rotor is arranged to match substantially the capability of said discharge expeller.

15. Apparatus for dispensing material comprising:
a container for material, the container having first and second longitudinally extending side walls, and first and second end walls,
a feeding rotor having an axis, said rotor being arranged within said container to extend longitudinally thereof, said rotor being rotatable about its axis to effect movement of material within the container in a direction generally from said first end wall towards said second end wall, and
discharge means mounted exteriorly to the container proximate to said discharge opening, said discharge means being arranged for causing material from said discharge opening to be expelled substantially transversely of said container,
wherein said feeding rotor comprises a plurality of individual blades extending outwardly of said rotor axis,
said blades each being positioned on a helical path which extends around said rotor axis, each blade extending at an angle to said rotor axis and across said helical path, the blades being so shaped that, when viewed along the axis of the rotor, immediately adjacent succeeding blades along the rotor do not overlap wherein the blades are positioned on said rotor such that no two blades are exactly aligned longitudinally of said rotor.

16. Apparatus according to claim 1, claim 9, or claim 15, in which the container is mounted on a mobile frame for movement over the ground, and the feed rotor is mounted in the container with its axis aligned generally along the direction of movement of the apparatus.

17. Apparatus for spreading manure comprising:
a container for material, the container having first and second longitudinally extending side walls, and first and second end walls, the first and second side walls transversely converging towards each other,
a discharge opening in said first side wall proximate to said second end wall of the container,
a feeding rotor having an axis, said rotor being arranged within said container to extend longitudinally thereof, said rotor being rotatable about its axis to effect movement of material within the container in a direction generally from said first end wall towards said second end wall, and
a discharge expeller having an axis which extends substantially longitudinally of the container, said expeller being mounted exteriorly to the container proximate to said discharge opening, said discharge expeller being rotatable about its axis for causing material from said discharge opening to be expelled substantially transversely of said container,
wherein said feeding rotor comprises a plurality of individual blades extending outwardly of said rotor axis, said blades being positioned on a helical path which extends around the rotor axis, each individual blade being at an angle relative to said rotor axis to extend across said helical path, and wherein said helical path extends in a reverse sense relative to the intended direction of movement of the material whereas said blades extend in the forward sense, and in which each blade has a leading edge which extends outwardly of said rotor axis, each said leading edge following a shallow curve to allow elongate, fibrous or matted material to slide up the leading edges of said blades.

18. Apparatus according to claim 1, claim 9, or claim 15, further comprising displacing means mounted within said container in the region of said discharge opening, said displacing means having an axis arranged substantially coaxially with said rotor axis, and said displacing means being rotatable about its axis to urge material within the container through said discharge opening in said first side wall of the container for expulsion by said discharge means.

* * * * *